Aug. 11, 1925.

H. BRUNNER

TRIMMING MACHINE

Original Filed Dec. 23, 1919

INVENTOR
Hans Brunner
BY
Emery Varney Blair & Hoguet
his ATTORNEYS

Aug. 11, 1925.

H. BRUNNER

TRIMMING MACHINE

Original Filed Dec. 23, 1919   2 Sheets-Sheet 2

1,549,443

INVENTOR
Hans Brunner
BY
Emery Varney Blair & Hoguet
his ATTORNEYS

Patented Aug. 11, 1925.

1,549,443

UNITED STATES PATENT OFFICE.

HANS BRUNNER, OF TRENTON, NEW JERSEY, ASSIGNOR TO ESSEX RUBBER COMPANY, OF TRENTON, NEW JERSEY, A CORPORATION OF NEW JERSEY.

TRIMMING MACHINE.

Application filed December 23, 1919, Serial No. 346,944. Renewed January 27, 1925.

*To all whom it may concern:*

Be it known that I, HANS BRUNNER, a citizen of Switzerland, and a resident of Trenton, in the county of Mercer and State of New Jersey, have invented an Improvement in Trimming Machines, of which the following is a specification.

This invention relates to an apparatus for cutting rubber goods.

More in particular it relates to the apparatus employed to cut the overflow from molded rubber articles.

One of the objects of this invention is to provide an apparatus which will cut articles made of rubber and its compounds, which will not overcut and spoil an article, which provides for the adjustment of the cutters, and which will provide for proper support of the article to be cut or trimmed.

This invention possesses many other and advantageous features, some of which, together with the foregoing, will be set out more at length in the following description wherein will be outlined in full the preferred embodiment of that form of the invention which has been selected for illustration in the drawings accompanying and forming a part of the present specification, wherein—

Figure 1:
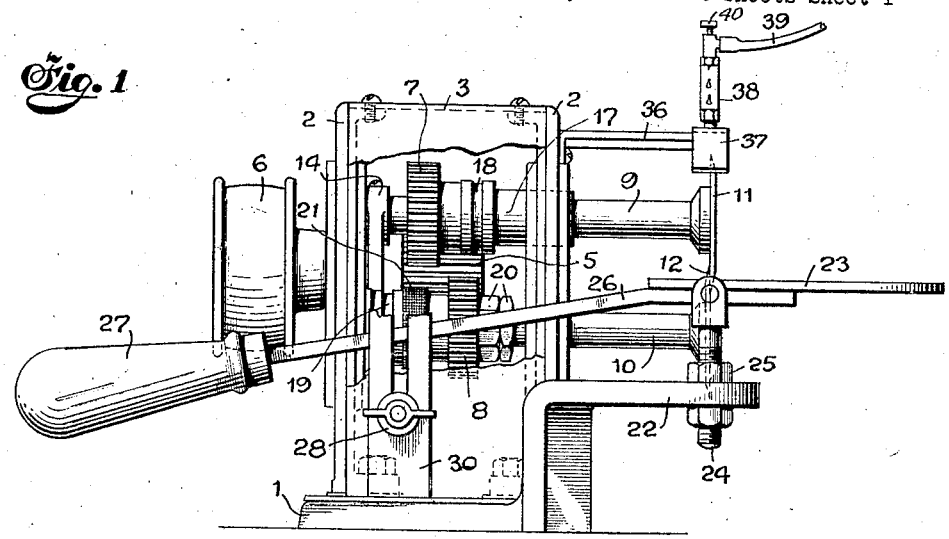
Figure 1 is a side view of a trimming machine.
Figure 2:
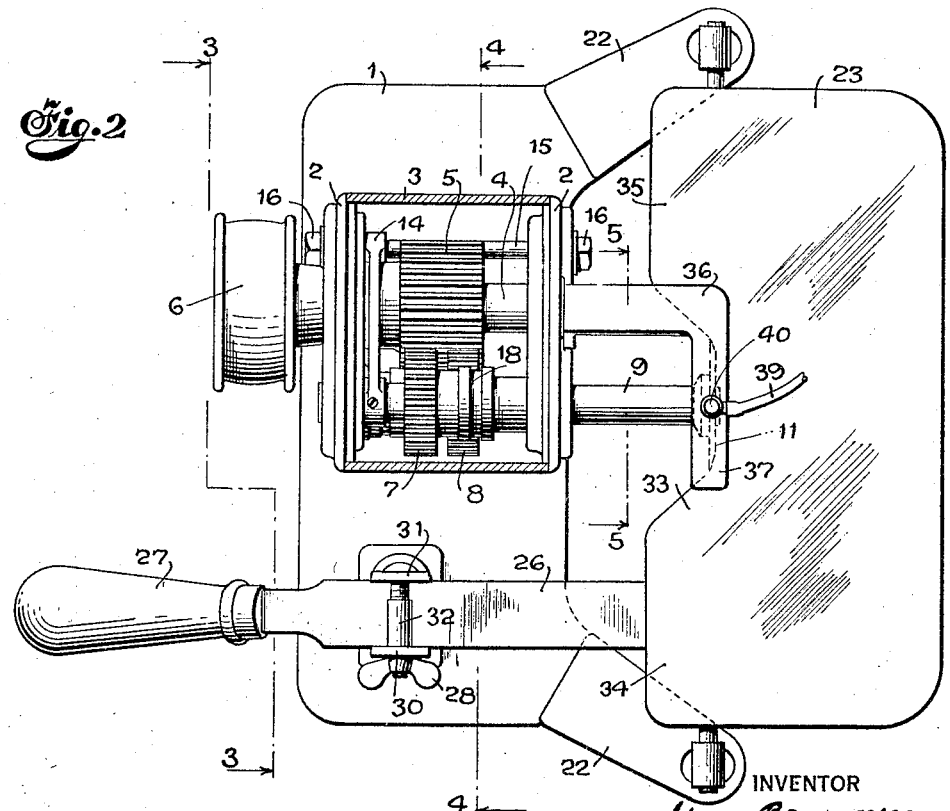
Figure 2 is a top plan view of the machine.
Figure 3:
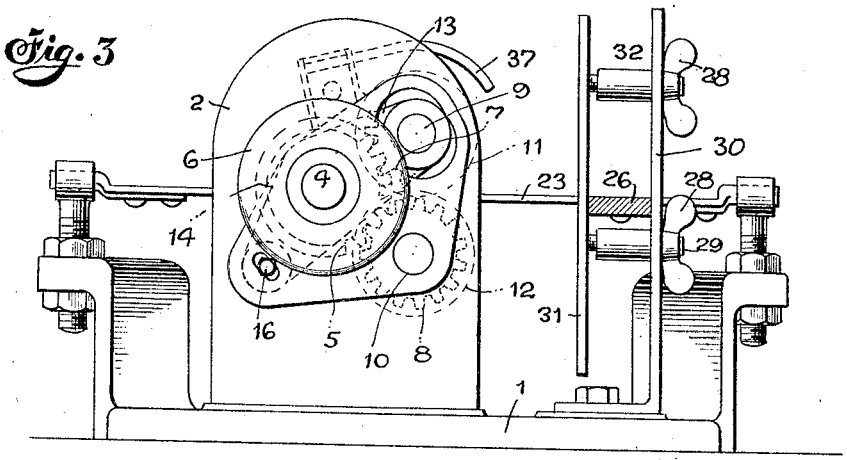
Figure 3 is a view of the machine taken on the line 3—3 of Figure 2.

Referring to the drawings which are of a preferred embodiment of the apparatus herein employed for purposes of trimming rubber articles and may be used for purposes of cutting articles made of rubber and its compounds, and referring particularly to Figure 1, the trimming machine has a base 1 and upright standards 2 extending therefrom and adapted to receive the cover 3. The standards support a main power shaft 4 carrying gear 5 and having pulley 6 which receives a power transmitting belt. This pulley may be substituted by a gear which may mesh with the gear of an electrical motor, or other suitable driving means may be employed. Preferably, the gear 5 is wide so that it will mesh with gears 7 and 8 which in turn drive shafts 9 and 10 respectively. On the end of these shafts are mounted cutters 11 and 12 which contact with each other and overlap a very small amount, although these cutters may operate so that the cutting edges of the cutters are in the same vertical plane.

As the cutters operate they wear considerably and the method of adjusting the cutters one to the other is provided by a relative movement to and from each other. Adjustment may provide for each of the cutters to be moved, but in this disclosure it is preferable to have one of the cutters remain in a stationary position and to have the other cutter move relative thereto. The cutter 12 and its shaft 10 is stationarily mounted in the upright standards. The shaft 9 is mounted in the upper portion 13 of yoke 14 which is pivoted on the power shaft 4. Any oscillating movement of the yoke carries the shaft 9 and its cutter 11 to and from the shaft 10 and during this movement the cutter 12 and the gear 7 are maintained in mesh with gear 5. The lower part of the yoke 14 carries the shaft 15 which has nuts 16 contacting with standards 2. After cutter 11 has been adjusted in proper relation to cutter 12, the nuts 16 are tightened and prevent the yoke from oscillating. The nuts 16 may be of the type shown or of the butterfly type which are easily operated by the fingers of the attendant.

Figure 5:
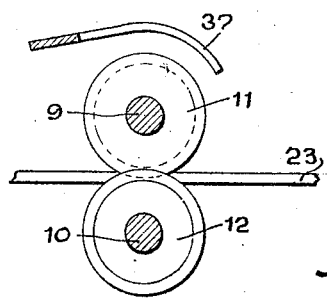
Figure 5 is a view partially in section taken on the line 5—5 of Figure 2.

The cutters 11 and 12 have their edges beveled in order to obtain a sharp cutting edge. Preferably, where the cutters overlap, as shown in Figures 1 and 5, the bevel is on one surface only of each cutter. This provides for the contacting of the flat faces of the cutters with each other. Preferably, the cutters when being used for trimming purposes overlap and provide a positive means for cutting the rubber rather than having the sharp edges of the cutters in the same vertical plane, however, for some purposes the edges of the cutters are preferably placed in the same plane.

Figure 4:
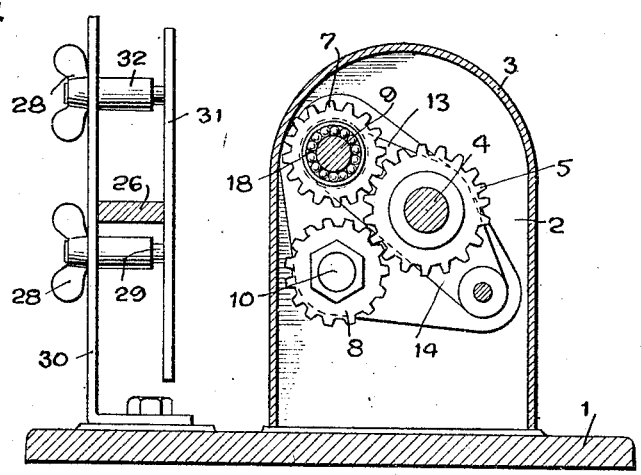
Figure 4 is a view in section taken on the line 4—4 of Figure 2.

When using the cutters in the overlap position, it is desirable that there should be a certain amount of play so that they will be maintained in positive contact with each other irrespective of any longitudinal movement of the shafts 9 and 10. In order to provide a flexible operating mechanism, the gear 7 is positively connected to shaft 9 and the bearing 17, which assists in supporting shaft 9, is firmly held in yoke 14. A ball thrust bearing 18 is provided for the relative movement between the gear 7 and the bearing 17; the bearing is illustrated more in detail in Figure 4. The shaft 10 carrying cutter 12 which overlaps with cutter 11 is longitudinally movable in respect to standards 2. The end of the shaft opposite the one carrying the cutter 12 is mounted in one of the standards and has a ball thrust bearing 19. The gear 8 is movably mounted on shaft 10 and is held in an adjusted position by nuts 20. A resilient washer 21, preferably made of sponge rubber, tends to move shaft 10 to the right thereby maintaining cutter 12 in contact with cutter 11. As there is longitudinal movement of shaft 9 there will be longitudinal movement of shaft 10, and this movement is taken up by the resilient washer which will return cutter 12 to normal position as shaft 9 is moved to the right. By means of adjusting nuts 20 varied working pressures may be obtained upon the resilient washer.

The base 1 has extensions 22 which provide means for holding an operating table 23. The bolts 24 and nuts 25 which pass through and contact with extensions 22 provide a means for raising and lowering the table and the arm 26 is attached to the table and movable by handle 27 so that the table may be oscillated in order to properly place the cutters in contact with the article to be cut. Preferably, the bolts 24 are in the same vertical plane as the center of the overlap of the two cutters, and the table is rotated on an axis in this plane. For work on various types of articles, the table may be adjusted so that the portion of the article to be cut will come in contact with the cutters at the proper position. This provides a flexibility of the apparatus which would not be true should the table be stationarily mounted in one position. The arm 26 may be firmly fastened in any adjusted position by means of the butterfly nuts 28 which operate on shafts 29 and against standard 30 and collars 32. The standard 31 may be attached to the base 1 or to one of the uprights. The table may be of any desired size and of practically any desired design. It is preferable, however, to have it flat and indented or cut away as shown at 33 to provide room for the cutters and to form extending ends 34 and 35 which provide for additional supporting surfaces.

A guard 36 extending from the standard 2 and having flat portion 37 provides a protector for the cutters and also provides a support for the apparatus through which a supply of water drips onto the knives. Preferably, the sight feed apparatus 38 is employed and is connected to any water supply 39. Adjustment 40 governs the flow of the water to the cutters.

In operating this machine the power shaft drives both of the shafts 9 and 10 in the same direction and the shaft 9 carries the cutter 11 so that it rotates toward the attendant. The bevel on this cutter being on the outside and in contact with the article to be cut will assist in carrying the article against the cutters and the cutter 12 will cause the small part which is being cut away when trimming the overflow from a rubber heel to move away from the heel and will not exert a tendency to draw the article against the cutters. It is preferable to have only one cutter exerting the influence of pulling the work towards the cutters.

It will be understood that the embodiment of the invention herein described and shown in the accompanying drawings may be variously modified, and that the present invention is susceptible of different embodiments. In so far as such modifications and embodiments of the invention come within the scope of the following claims they are considered to be within the scope of the invention.

I claim:

1. In an apparatus of the class described the combination of a main power shaft having a driving gear thereon, individual shafts adapted to have relative motion therebetween, gears on said shafts adapted to mesh with said driving gear, a yoke for supporting one of said individual shafts and adapted to rotate about the axis of the main power shaft and adapted to be held in predetermined position, cutters mounted on said individual shafts and rotating in the same direction, and an oscillating table mounted in proximity to said cutters and adapted to have its axis of rotation in the plane of the meeting point of said cutters, and means for adjusting said table and maintaining the same in a predetermined position.

2. Apparatus for trimming the edges of rubber articles, comprising overlapping upper and lower disc cutters, an oscillating table mounted in proximity to said cutters and adapted to have its axis of rotation in the plane of the meeting point of said cutters, and means for adjusting said table as to height and angle and maintaining the same in a predetermined position, together with means for rotating said cutters in the same direction, the direction of rotation being such that the cutting edge of the upper cutter operates downwardly toward the table, whereby the work is pressed against the table by the cutting action.

3. In an apparatus of the class described, the combination of a main power shaft, individual shafts adapted to have relative motion therebetween, a yoke for supporting one of said individual shafts and adapted to rotate about the axis of the main power shaft and arranged to be held in predetermined position, cutters mounted on said individual shafts and gearing connecting the individual shafts to drive the same from the main power shaft and an oscillating table mounted in proximity to said cutters and adapted to have its axis of rotation in the plane of the meeting point of said cutters, and means for adjusting said table and maintaining the same in predetermined position.

4. An apparatus for trimming the edges of rubber articles comprising overlapping upper and lower disc cutters, an oscillating table mounted in proximity to said cutters and having an axis of rotation closely adjacent the plane of the meeting point of said cutters and means for adjusting said table as to height and angle and for maintaining the same in predetermined position, together with means for rotating said cutters.

In testimony whereof, I have signed my name to this specification this twentieth day of December, 1919.

HANS BRUNNER.